United States Patent [19]

Betterton et al.

[11] Patent Number: 4,846,762
[45] Date of Patent: Jul. 11, 1989

[54] SHAFT COUPLER FOR AUTOMATED ASSEMBLY

[75] Inventors: Joseph T. Betterton, Arab; Alfred H. Glover, Decatur; Bruce Hepler, Huntsville, all of Ala.

[73] Assignee: Chrysler Motors Corporation, Highland Park, Mich.

[21] Appl. No.: 174,252

[22] Filed: Mar. 28, 1988

[51] Int. Cl.⁴ ............................................. F16D 1/02
[52] U.S. Cl. ..................................... 464/87; 403/294; 403/300; 464/182; 464/901
[58] Field of Search ............... 24/573; 403/220, 223, 403/294, 300, 305, 306, 309, 313; 411/511, 512; 464/51, 87, 101, 182, 185, 901

[56] References Cited

U.S. PATENT DOCUMENTS

| | | |
|---|---|---|
| 218,723 | 8/1879 | Faust . |
| 2,404,017 | 7/1946 | Wilkinson . |
| 2,580,000 | 12/1951 | Batcher . |
| 2,724,251 | 1/1953 | Weaver ............................ 464/101 |
| 2,903,867 | 2/1956 | Moody ............................. 464/101 |
| 3,340,704 | 9/1967 | Seckerson ........................ 464/101 |
| 3,873,863 | 3/1975 | Pew ................................. 464/87 X |

FOREIGN PATENT DOCUMENTS

| | | | |
|---|---|---|---|
| 0101129 | 4/1962 | Netherlands ..................... | 464/182 |
| 1032307 | 6/1966 | United Kingdom ............... | 411/512 |

Primary Examiner—Daniel P. Stodola
Attorney, Agent, or Firm—Kenneth H. MacLean, Jr.

[57] ABSTRACT

A shaft coupler particularly adapted for automated assembly to axially spaced ends of two axially aligned shafts such as are commonly found in an odometer assembly. The coupler has a main body portion with a guide portion adapted for insertion between the shaft ends and spaced legs at either end adapted for sliding insertion over flats formed on the shaft ends. The main body has a projection therefrom adapted to be grippingly engaged by an installation tool. Also, the projection and tool define mutual nonsymmetrical portions for orienting the tool and coupler relative to the shaft so that the coupler may be installed thereto in a simple radially directed movement.

3 Claims, 1 Drawing Sheet

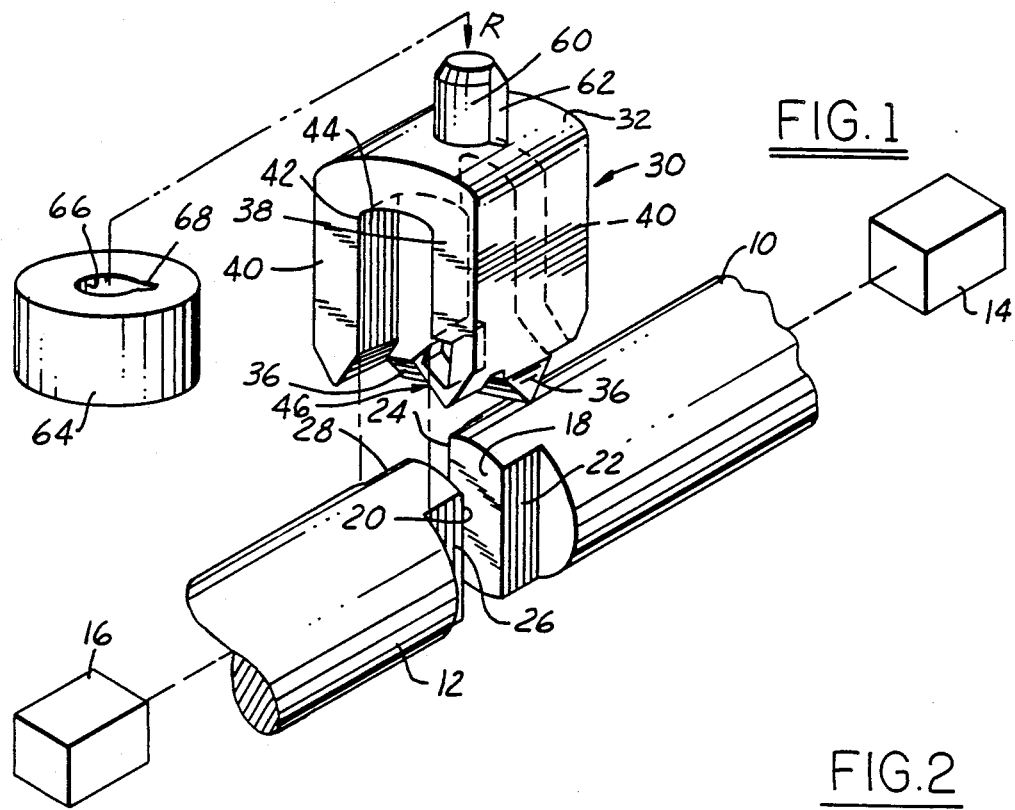
FIG. 1
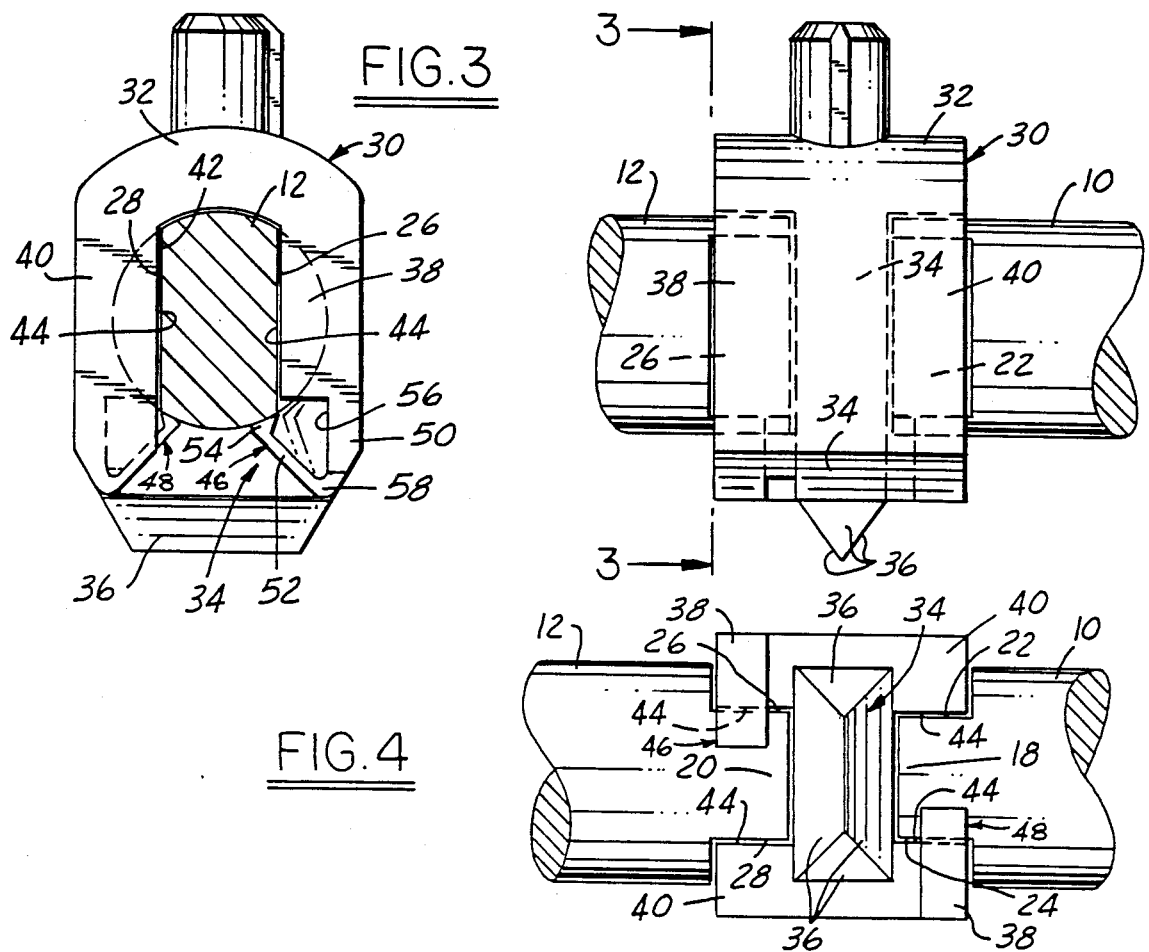
FIG. 2
FIG. 3
FIG. 4

SHAFT COUPLER FOR AUTOMATED ASSEMBLY

BACKGROUND OF THE INVENTION

1. Field of the Invention

This application concerns an improved coupler device particularly adapted for the automatic assembly thereof to the aligned ends of two shafts as in an odometer assembly. Specifically, many odometer assemblies provide both a primary odometer shaft and trip odometer shaft which are aligned end to end. The shafts support wheels which are used for counting and visually indicating mileage of an automobile. The subject coupler device is adapted to be assembled by automated equipment to the shaft ends in a radial direction and by an insertive motion. A catch-tab means is operative with the shafts to inhibit removal of the coupler in an opposite radial direction.

2 Description of Related Art

In any device and particularly in an automobile odometer assembly having two separate and axially aligned shafts, it is often desirable to connect or couple the shafts for rotation together by a coupler device which is easily and automatically applied to the adjacent shaft ends. The subject coupler device is an improvement over a number of such devices. The U.S. Pat. No. 2,724,251 to Weaver discloses a coupler for two shafts, the coupler having a slot formed in one portion adapted to receive a first shaft end and with portions or "ears" in another portion which define a gap normal to the first slot. The coupler is first inserted over the end of one shaft while the second portion or ears are biased inward toward the other portion so that the coupler clears the second shaft.

The U.S. Pat. No. 2,903,867 to Moody discloses a coupler for connecting two shafts. Like the Weaver patent, the device is inserted over one shaft end while simultaneously squeezed together so that the side walls can move between the spaced ends of the shafts. Resultantly, both walls must be moved from their relaxed positions to install the coupler. Both the Weaver and the Moody patents are designed for manual application and thus unsuitable for automated application to the ends of shafts.

The following U.S. Pat. Nos. disclose couplers of general interest but unlike the subject device do not possess features which permit easy automated application by insertion over and between adjacent ends of aligned shafts.

481,780
2,404,017
2,580,000
3,662,568

SUMMARY OF THE INVENTION

This application concerns an improved coupling device for connecting adjacent end portions of two axially aligned shafts such as found in some automobile odometers with side-by-side primary and trip odometer rolls. The improved coupler is particularly designed to permit the device to be assembled automatically by an insertive motion in the shaft's radial direction and over the end portions of the shafts. Thus, with this device, it is unnecessary to axially shift the shafts. Nor is it necessary to alter or pre condition the coupler in any manner prior to assembly to the shafts. Accordingly, it is not necessary to simultaneously insert the coupler and apply a squeezing force on it or the like so that portions may clear the shaft ends.

The subject coupler has a unitary structure of molded plastic or the like. The coupler includes a base portion or body with a thin central guide portion which is adapted to slide between the aligned and axially spaced shaft ends. The coupler also includes an installation tab or projection adapted to be gripped by an installing device to automatically assemble the coupler to the shaft ends. At both ends of the coupler and on either side of the central guide portion are spaced legs which form a drive pocket. The legs which form the drive pocket and an associated end wall connecting the legs together define an open ended slot. Resultantly, an open ended slot at either end of the coupler is formed and the slots are parallel to one another. The shaft ends are configured with parallel flats and aligned so that during installation of the coupler a surface of one shaft is coplanar with a surface of the other shaft. Likewise, the other surface of one shaft is also coplanar with the other surface of the other shaft. This construction and shaft orientation permits the coupler to be easily inserted over the shaft ends in a radial direction thereof. At the same time, the slots receive and extend about the flats of the shaft ends.

One leg of the coupler at either end has a flexible catch-tab which is integrally connected to the leg and terminates near a flat of the shaft to attach the coupler to the shaft and thus resist radial disconnecting movements. This inhibits undesired removal of the coupler. However, while the coupler is being installed over the shaft ends, the catch-tab is moved away from the shaft so that the coupler may freely slide over the shaft flats.

Therefore, an object of this invention is to provide an improved unitary coupler adapted for easy and automatic assembly on the ends of two shafts including spaced legs at either end of the coupler which define parallel slots for sliding over flats on the shaft ends for easy insertive assembly of the coupling to the shafts by a radially directed motion.

Another object of the invention is to provide a coupler with a projecting tab adapted to be gripped by an installation tool means to thereby secure the coupler and align it prior to installation to the shaft ends. The tab has alignment means cooperative with the installation tool to correctly orient the coupler with respect to the shaft ends.

Still further objects and advantages of the subject coupler will be more readily apparent after a reading of the following detailed description of a preferred embodiment, reference being had to the drawings which illustrate the embodiment.

IN THE DRAWING

FIG. 1 is a perspective view of the coupler in relation to the aligned shaft ends prior to assembly; and FIG. 2 is a side view of the coupler after the insertive assembly over the shaft ends; and FIG. 3 is a sectional end view of the coupler after assembly to the shaft ends taken along section lines 3—3 in FIG. 2 and looking in the direction of the arrows; and FIG. 4 is a bottom planar view of the assembled coupler and shafts.

DETAILED DESCRIPTION OF A PREFERRED EMBODIMENT

In FIG. 1, two shafts 10 and 12 of an automobile odometer assembly are illustrated. The odometer assembly includes both a total or permanent mileage recorder 14 and a trip mileage recorder 16 which are only shown schematically. Each of the recorders 14 and 16 is of the type utilizing a plurality of wheels rotatively supported on a common shaft. Thus shaft 10 supports the permanent recorder 14 and shaft 12 supports the trip recorder 16. The shafts are axially aligned and mounted on an odometer frame (not shown in the drawings). A drive mechanism (not shown) is operably attached to the shaft 10 to cause the shaft to rotate according to automobile movement. The rotation of shaft 10 produces rotation of the permanent odometer recorder 14 in a manner well known in the odometer art. Likewise, the means of operably driving the shaft 10 is well known.

It is desirable to produce rotation of the other shaft 12 in correspondence t o the rotation of the shaft 10. Rotation of the shaft 12 will move the trip odometer recorder 16 in the same manner that the permanent odometer recorder 14 is moved by shaft 10 is moved. Accordingly, the end portions 18 and 20 of shafts 10, 12 are formed with flats 22, 24, 26 and 28. The flats 22 and 24 formed on the end of shaft 10 form parallel surfaces as do the flats 26 and 28 on the end of shaft 12. The shafts 10 and 12 are oriented for assembly with pairs of flats 22, 26 and 24 and 28 aligned and coplanar as is illustrated. This permits the subject unitary coupler 30 to be assembled to the shaft ends 18 and 20 by a single and simple insertive movement in the radial direction R in FIG. 1 as will be even clearer by the following explanation.

The unitary coupler 30 has central base or body with an upper end portion 32 as seen in FIG. 1. The end portion 32 has a central guide portion 34 extending downward therefrom. The axially extending thickness dimension of the guide portion 34 is slightly less than the distance which is designed for between the shaft ends as best seen in FIG. 4. Also, the lower end of the guide portion 34 is configured to form a point with inclined surfaces 36 so that the guide portion may be easily slid between the spaced end portions 18 and 20 of the shaft. The central guide portion contributes greatly to the ease of assembling the coupler to the shaft ends. It also greatly facilitates the automatic assembly of the coupler to the shafts.

Each end of the unitary coupler 30 has spaced legs 38 and 40 with inner surfaces 44 which define an elongated drive slot 42 between the legs. As best seen in FIG. 1, the upper end portions of the legs 38 and 40 are integrally connected by portion 32 to close the upper end of the slot 42. As best shown in FIGS. 1 and 3, the lower portions of the legs are unconnected to form a shaft receiving opening to the slot 42. In the assembled position of the coupler, the inner surfaces 44 of legs 38 and 40 extend along the surfaces 22–28 forming the flats on the shaft ends.

The coupler also includes two catch-tabs 46 and 48 which are integral with the lower ends of legs 38, one at either end of the coupler. As best seen in FIGS. 1 and 3, the catch tabs 46 and 48 are formed by thin walled side 50 and bottom 52 portions and an end portion 54. The thin configuration of the walls 50, 52 is created by a hollow 56 formed in during and by the molding of the coupler. The portions 50 and 52 are connected by a thin integral hinge 58. The hinge 58 permits the end 54 to move outward to the dashed line position in FIG. 3 so that the coupler 30 can slide over either surface of the shaft flats. After the flat configured portion of the shaft is fully within the slot 42, the end 54 returns to its natural position shown in solid lines and opposite dissassembling movement of the coupler is inhibited.

A significant advantage of the subject coupler is the improved ease in assembly of the coupler to the shaft ends, particularly by automatic equipment as is so desirable today for high volume products. The pre-assembly position of the coupler is shown in FIG. 1, slightly away form the ends of the shaft. To facilitate the automatic assembly of the coupler to the shafts, a projection or tab 60 is integrally mold formed with the coupler midportion 32. The projection 60 is substantially of cylindrical form but also includes an axially extending alignment tang 62 of substantially triangular cross-sectional shape. Also, the outer end of the projection 60 is beveled to allow easy insertion into an aperature.

The projection 60 and tang 62 are adapted to be engaged by a gripping tool or fixture 64. The tool 64 as shown in FIG. 1 has a body with a cylindrical shape although other shapes could be as appropriate. The tool 64 has an aperature 66 therethrough which includes an interconnected slot 68 adapted to receive the projection 60 and tang 62 respectively. Thus tool 64 receives the part 60 of the coupler 30 so that operatively connected automatic installation or assembly equipment (not shown) can apply an insertive radial or downward installation force on the coupler causing it to be applied over the ends of the shafts. Subsequently, the installation tool is moved away from the coupler in an opposite radial direction while the coupler is secured to the shafts by the portions 54.

From the foregoing description and the drawings, it can be understood that the subject coupler is designed for automated installation over the end portions of two spaced and aligned shafts without movement of either of the shafts. This installation requires only a light force on the installation tool and coupler in a radially inwardly direction with respect to the shaft. Although only one embodiment of the coupler is shown and described in great detail, it is obvious that modifications to the coupler can be made which still fall within the scope of the following claims which define the invention.

what is claimed is as follows:

1. A unitary coupler device for axially aligned shafts particularly adapted for automated assembly thereto about spaced ends of the shafts, the automated assembly being accomplished by an installation tool for moving the coupler in a radial direction relative to the axes of the shafts, each shaft end being configured with parallel flats and the shafts aligned so that one flat of one shaft is substantially coplanar with one flat of the second shaft and the other flat of the first shaft is coplanar with the other flat on the second shaft, the coupler device comprising: a main body portion having a guide wall portion which projects therefrom for extention between the spaced shaft ends; a pair of spaced legs formed on each end of the coupler which define slots therebetween for receiving the flat end configuration of the shafts, the legs and the slots formed thereby extending substantially parallel to one another; the spacing between legs being just sufficient to permit the reception of the flat configured shaft ends into the slots as the coupler is inserted in a radial direction relative to the axes of the shafts; yieldable means on at least one leg of each pair of legs for gripping the respective shaft when the coupler is installed over the shafts and inhibiting disassembly of the coupler therefrom; the body of the coupler having an outwardly extending projection formed thereon with an axis parallel to the aforesaid direction of radial installation movement, the projection having a nonsymmetrical tang portion adapted to correspond and coact with a receiving portion of the aforesaid installation tool to grippingly support the projection and the coupler in a desirable orientation so that the coupler's guide wall portion is insertively installed between the spaced shaft ends and the coupler legs are slidingly installed along the surfaces of the shaft's flat configuration.

2. The coupler set forth in claim 1 in which the projection takes the form of a cylindrical body and the tang portion is an axially extending ridge thereon.

3. The coupler set forth in claim 2 in which the coupler body is of readily molded elastomeric material and the projection and tang portion thereon are integral with each other and the main body portion.

* * * * *